(12) United States Patent
Wandschneider

(10) Patent No.: US 10,575,643 B2
(45) Date of Patent: Mar. 3, 2020

(54) DEVICE FOR TRIGGERING A GAS SPRING AND SEATING UNIT COMPRISING ADJUSTABLE BACKREST HAVING A GAS SPRING AND SUCH AN APPARATUS

(71) Applicant: Guido Wandschneider, Eschelbronn (DE)

(72) Inventor: Guido Wandschneider, Eschelbronn (DE)

(*) Notice: Subject to any disclaimer, the term of this patent is extended or adjusted under 35 U.S.C. 154(b) by 0 days.

(21) Appl. No.: 15/576,898

(22) PCT Filed: May 14, 2016

(86) PCT No.: PCT/DE2016/000208
§ 371 (c)(1),
(2) Date: Nov. 27, 2017

(87) PCT Pub. No.: WO2016/192699
PCT Pub. Date: Dec. 8, 2016

(65) Prior Publication Data
US 2018/0146785 A1 May 31, 2018

(30) Foreign Application Priority Data
Jun. 5, 2015 (DE) .................... 20 2015 003 901 U

(51) Int. Cl.
*A47C 1/027* (2006.01)
*F16F 9/02* (2006.01)
(Continued)

(52) U.S. Cl.
CPC ............ *A47C 1/027* (2013.01); *B60N 2/0228* (2013.01); *B60N 2/0244* (2013.01);
(Continued)

(58) Field of Classification Search
CPC .... A47C 1/027; B60N 2/0244; B60N 2/0228; B60N 2/2227; B60N 2/242; B64D 11/0639; F16F 9/0263; F16F 9/029
See application file for complete search history.

(56) References Cited

U.S. PATENT DOCUMENTS

| 3,896,346 A | 7/1975 | Ule |
| 5,090,770 A | 2/1992 | Heinrichs et al. |

(Continued)

FOREIGN PATENT DOCUMENTS

| DE | 3810619 C2 | 4/1992 |
| DE | 10111385 C2 | 2/2003 |

(Continued)

OTHER PUBLICATIONS

Translation of the International Preliminary Report on Patentability, PCT/DE2016/000208, dated Dec. 14, 2017.

(Continued)

*Primary Examiner* — Xuan Lan Nguyen
(74) *Attorney, Agent, or Firm* — Smartpat PLC

(57) ABSTRACT

A device for triggering a gas spring (1) comprising an actuation device (2), an actuating element (4) which is operatively connected to the actuating device (2) and which acts directly on an end trigger (3) of the gas spring (1), wherein the actuating element (4) is configured as a lever arrangement (5) which reduces or multiplies the force or path, wherein one of the levers (trigger lever (6)) presses directly onto the trigger (3), wherein the actuating device (2) comprises an electrical magnet unit (30), which is provided with electric energy via an electrical supply and can be activated via a switch unit (60), characterised in that there is a control unit (40) which can be activated via the switching unit (60) and activates the electric magnet unit (30) according to the signals of the switch unit (60), wherein the the magnet unit (30) is actuated such that for a predetermined (Continued)

time interval an override phase of the magnet unit (30) with an increased voltage and a subsequent holding phase with a reduced voltage are produced.

17 Claims, 3 Drawing Sheets

(51) Int. Cl.
    *B64D 11/06*     (2006.01)
    *B60N 2/02*     (2006.01)
    *B60N 2/22*     (2006.01)
    *B60N 2/24*     (2006.01)
    *B61D 33/00*     (2006.01)
    *B63B 29/04*     (2006.01)

(52) U.S. Cl.
    CPC ........ *B60N 2/2227* (2013.01); *B64D 11/0639* (2014.12); *F16F 9/029* (2013.01); *F16F 9/0245* (2013.01); *F16F 9/0263* (2013.01); *B60N 2/242* (2013.01); *B61D 33/0007* (2013.01); *B63B 2029/043* (2013.01); *F16F 2230/18* (2013.01)

(56) References Cited

U.S. PATENT DOCUMENTS

| | | | |
|---|---|---|---|
| 5,538,115 A | 7/1996 | Koch | |
| 6,220,582 B1 | 4/2001 | Wandschneider | |
| 7,138,779 B2 * | 11/2006 | Robert | B60N 2/0244 318/466 |
| 7,911,163 B2 * | 3/2011 | Nivet | B60N 2/0244 318/266 |
| 2003/0080699 A1 * | 5/2003 | Rumney | B60N 2/002 318/9 |
| 2016/0160953 A1 | 6/2016 | Wandschneider | |

FOREIGN PATENT DOCUMENTS

| | | |
|---|---|---|
| DE | 19716720 | 3/2006 |
| EP | 1328738 B1 | 12/2004 |
| GB | 2138102 B | 10/1986 |

OTHER PUBLICATIONS

German Patent and Trademark Office, Search Report in related German patent application DE 10 2015 006 949.7, dated May 9, 2016.

* cited by examiner

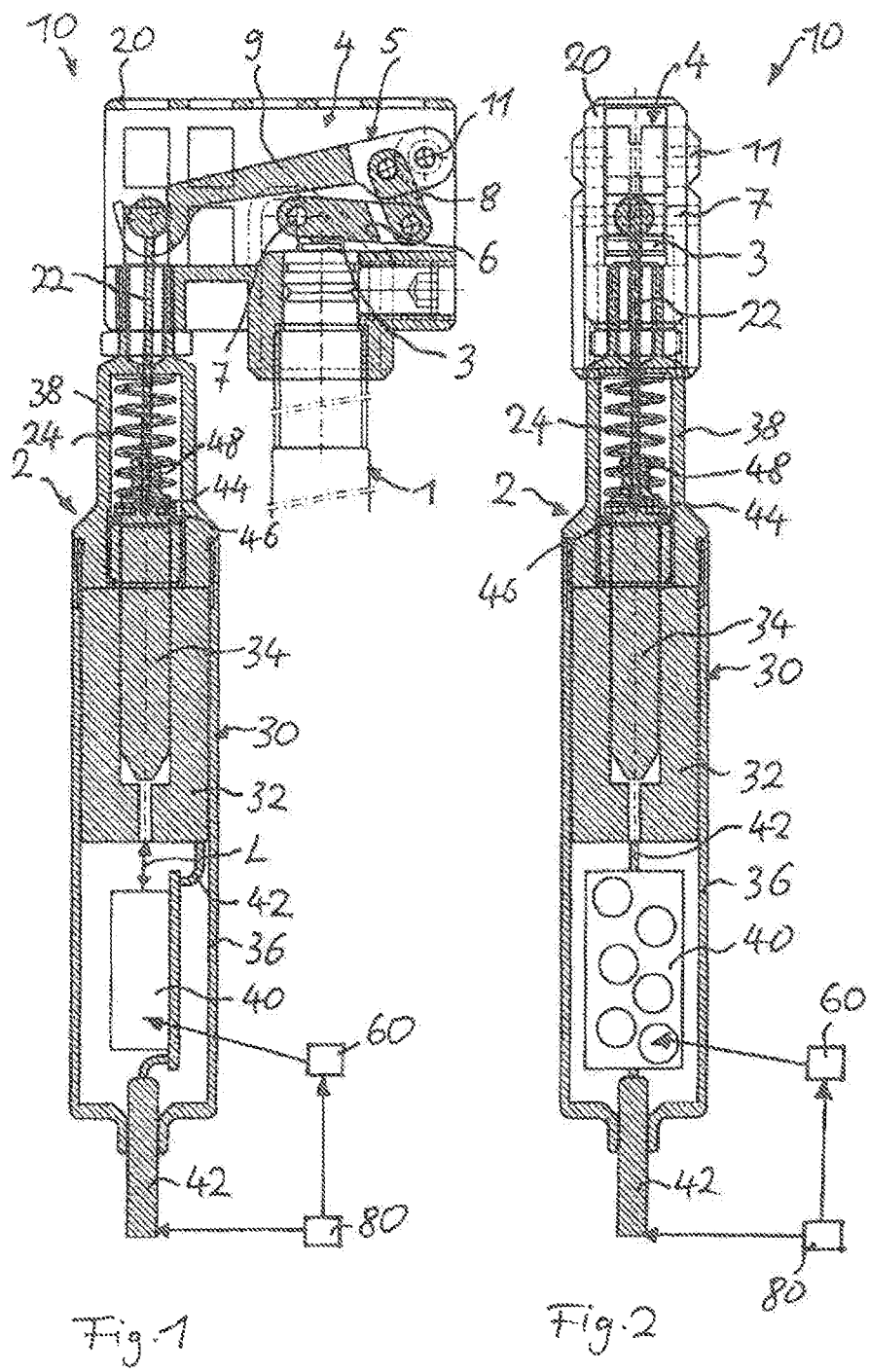

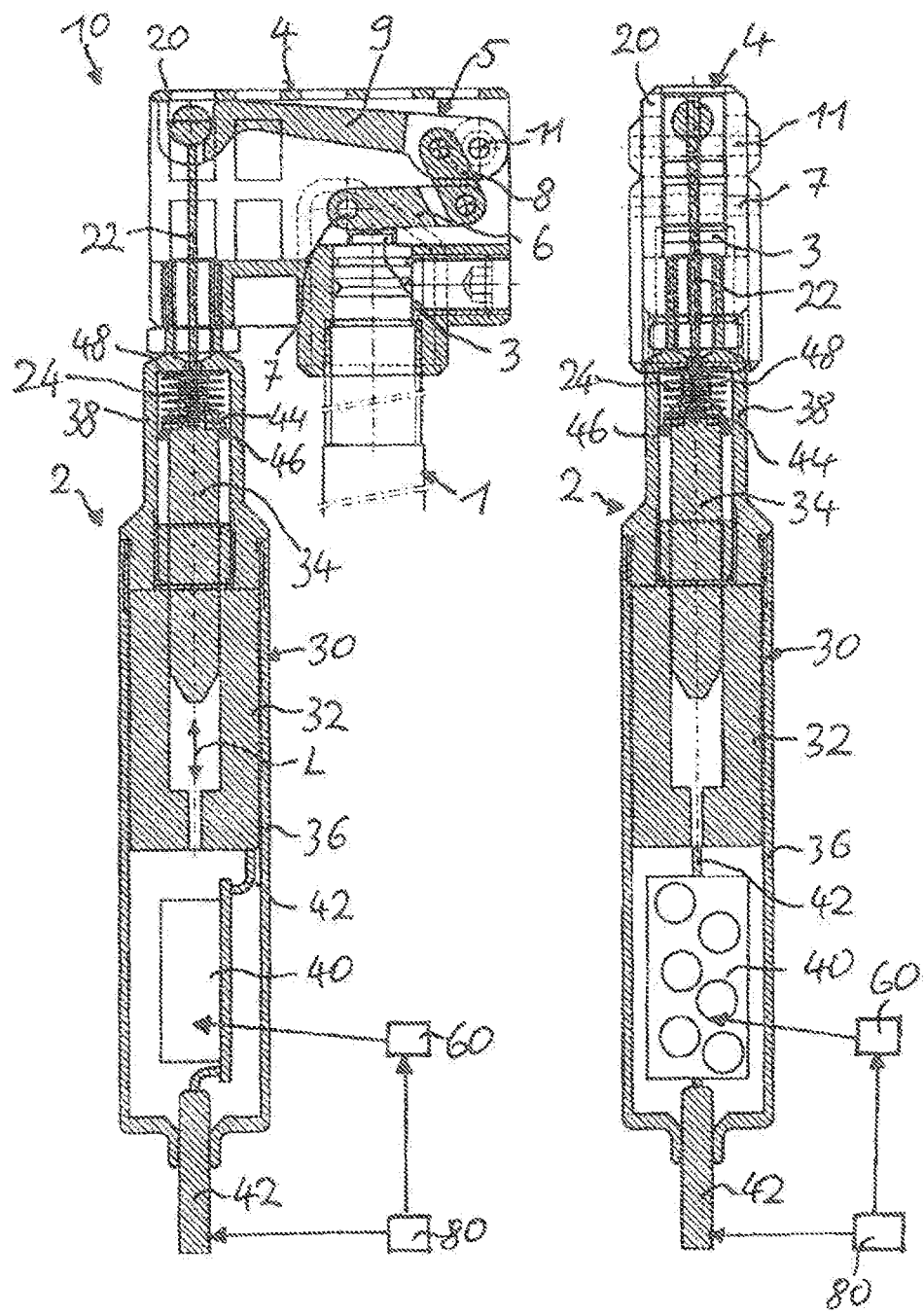

DEVICE FOR TRIGGERING A GAS SPRING AND SEATING UNIT COMPRISING ADJUSTABLE BACKREST HAVING A GAS SPRING AND SUCH AN APPARATUS

TECHNICAL FIELD

The present invention relates to a device for triggering a gas spring, comprising an actuating device, an actuating member which is operatively connected to the actuating device and acts directly on an end-side trigger of the gas spring, wherein the actuating member is designed as a lever arrangement which reduces or multiplies in terms of force and/or travel, wherein one of the levers—triggering lever—pushes directly onto the trigger, wherein the actuating device has an electric magnet unit which is supplied with electrical energy via a current supply and can be activated via a switching unit.

The present invention furthermore relates to a seating unit comprising an adjustable backrest ("backrest recline") having such a device and an arrangement having a plurality of seating units, each having such a device.

PRIOR ART

Gas springs are known in a very wide variety of embodiments in practice. Numerous gas springs comprise an integrated valve system, as a result of which the gas spring can be infinitely variably locked or blocked in every position. The piston is sealed here against a pressure tube and separates two gas chambers from each other. When the valve is closed, the gas spring is arrested and permits blocking in the desired position. By actuation of the trigger, which is generally realized as a triggering tappet, the valve is opened and the gas spring can thus be positioned in an infinitely variable manner. The push-out speed and damping can be correspondingly varied here by selection of the jet in the piston.

Gas springs of the type discussed here are used in a very wide variety of ways. The use of such gas springs in desk chairs is known in practice. Similarly, car seats or aircraft seats can be adjusted or parts of sunbeds can be moved by means of gas springs. Desks can also be adjusted in height by means of gas springs.

The gas springs known in practice require an actuating member which is operatively connected to an actuating device and acts directly on the trigger provided on the end side of the gas spring. In the case of desk chairs, for example, use is made of actuating members which are designed in the form of simple levers which generally press with an end-side region directly against the trigger. Such a configuration of the actuating member has the great disadvantage that considerable forces for triggering the gas spring are nevertheless required. Added to this is the further disadvantage that the triggering can only be metered with difficulty, and therefore control of the gas spring speed in the event of considerable triggering forces is as good as impossible.

EP 0 907 842 B1 discloses a device of the type in question for triggering a gas spring of the type mentioned at the beginning. The actuating member of the known device also comprises, in addition to the triggering lever, two further levers which are coupled pivotably to the triggering lever. A Bowden cable is used here as the actuating device. Furthermore, this known device discloses the alternative that the actuating device acts on the actuating member via a magnet—an electrically operating lifting or pressing magnet.

Furthermore, further devices for triggering a gas spring, in which a lever mechanism is likewise used, are known from DE 197 16 720 A1 and from EP 1 328 738 B1. In the case of the device known from DE 197 16 720 A1, there are two levers which interact via a contact region. The operative connection between the levers is realized either via a toothing or via friction surfaces lying against each other. The device according to EP 1 328 738 B1 is designed in such a manner that the contact region and/or the actuating lever of the lever mechanism have/has a freely rotatable roller or ball for rolling onto the actuating region and/or the contact region.

WO 2015/010673 A2 discloses a further possibility of embodying the device for triggering a gas spring, which is distinguished in that on the housing there is a first connection unit for connection of an actuating device which runs substantially parallel to the longitudinal direction of the gas spring and there is a second connection unit which runs substantially transversely with respect to the longitudinal direction of the gas spring.

SUMMARY OF THE INVENTION

Starting from the prior art mentioned, the present invention is based on the object or the technical problem of refining and developing a device for triggering a gas spring of the type mentioned at the beginning, which device can be used in a very wide variety of geometrical space conditions of the surrounding components, can be produced economically, ensures permanently reliable functioning, is of space-saving design and can be adapted variably to the respective requirements and also meets increased safety requirements.

The present invention is furthermore based on the object of specifying a seating unit comprising an adjustable backrest ("backrest recline") or an arrangement of seating units, which seating unit has a high safety standard and permits a space-saving arrangement.

The device according to the invention for triggering a gas spring is provided by means of the features of independent claim 1. Advantageous refinements and developments are the subject matter of the claims which are dependent directly or indirectly on independent claim 1.

The seating unit according to the invention or arrangement of seating units is provided by the features of claim 12, 13 or 14.

The device according to the invention for triggering a gas spring is accordingly distinguished in that there is a control device which can be activated via the switching unit and which activates the electric magnet unit depending on the signals of the switching unit, wherein the magnet unit is activated in such a manner that, for a predetermined interval of time, an override phase of the magnet unit with an increased voltage and a subsequent holding phase with a reduced voltage is generated.

The design according to the invention of the control device ensures permanently reliable functioning, wherein the forces required for operating the gas spring can easily be generated and used, additional mechanical components, such as a Bowden cable, can be dispensed with and a desired metering of the required forces in order to produce the desired function can easily be realized.

A particularly preferred refinement of the device according to the invention is distinguished in that the control device is designed in such a manner that the duration of the interval of time of the override phase and/or the magnitude of the voltage in the interval of time of the override phase and/or the magnitude of the voltage in the holding phase subsequent to the override phase can be fixedly predetermined or can be programmed variably depending on the application.

In the practical cases in which there is a multiplicity of devices, for example in the seat arrangement of an interior cabin of an aircraft, and in which a current supply having not too great a capacity is available, it can be advantageous, in order to prevent overloading of the energy supply, to fix the duration of the interval of time of the override phase to a few milliseconds, for example below 10 milliseconds. In other applications and depending on the capacity of the current supply and the magnet units used, a substantially greater period of time can also be specified. For this purpose, the control device is configured to be programmable, and therefore said period of time can be optimally adapted to the respective application.

In practical applications, the voltage within the interval of time of the override phase is, for example, 6, 12, 18, 24 or 28 volts and the voltage in the holding phase subsequent to the override phase is 6 volts. However, these are merely examples of voltage details resulting from practical tests. The voltages can deviate upward or downward from the values stated, depending on the intended use, current network present and magnet units used.

In order to prevent overloading of the current network when the gas spring is activated, in particular when a plurality of devices are present, a particularly advantageous refinement is distinguished in that the device has a first electric buffer storage unit and/or a second buffer storage unit which is directly connected to the voltage supply separately from the device and from which the control device, upon activation during the override phase, at least partially or entirely retrieves the electrical energy for the magnet unit.

The electric buffer storage unit is preferably designed as a capacitor or accumulator, which ensures economical production, permanently reliable functioning and simple operation.

The use of a second buffer storage unit which has a particularly high capacity is particularly advantageous if there is a high number of devices for triggering a gas spring, as, for example, in seat arrangements of aircraft, buses, trains or ferries, and a current network having not too great a capacity is available, and therefore sufficient energy is available even when a multiplicity of devices are actuated simultaneously.

With regard to the structural realization, an advantageous compact variant embodiment which requires little space is distinguished in that the electric magnet unit is designed as a linear lifting magnet unit with a hollow coil body and an armature body which is mounted in a longitudinally displaceable manner in the hollow coil body, wherein the armature body is coupled to the lever mechanism of the actuating member via an actuating element.

The reliable functioning of the device is ensured, according to a particularly advantageous refinement, in that there is an elastic unit, in particular spring unit, under the action of which the armature body is present in a longitudinally displaceable manner.

In an advantageous structural refinement of said structural variant embodiment, the actuating element is designed as a cable.

The elastic unit can be designed, for example, as a compression spring. In this case, said unit supports the magnet unit in the activation state to the effect that, in addition to the magnetic force, the spring force of the compression spring additionally also acts on the lever mechanism.

In order to protect the device against environmental influences, soiling and damage, a particularly advantageous development is distinguished in that there is an actuating device housing in which the control device, the magnet unit, the spring unit and the actuating element, the latter at least partially, are arranged.

A variant embodiment which is particularly advantageous and compact in respect of preassembly is distinguished in that the actuating device housing is connected to the housing of the actuating member and the actuating element projects into the housing and is connected to an actuating lever of the lever mechanism, wherein the actuating device housing is preferably designed as a hollow profile, in particular cylindrical hollow profile, with an upper-side connection cap unit.

The actuating device housing can also be present spaced apart from the housing of the actuating member, and therefore an elongated actuating element is used. Since the actuating element is preferably designed as a flexible cable, the arrangement of the housing can therefore be adapted to the respective space conditions in the position in which the housing is to be fitted.

A particularly preferred refinement of the actuating member which is known per se in conjunction with the electric magnet unit within the scope of the actuating device is distinguished in that the triggering lever is coupled at one end so as to be pivotable about a first positionally fixed axis of rotation and pivotably connected at its other end to a second lever—connecting lever—at the end thereof, the connecting lever being connected pivotably at another end to a third lever—actuating lever, and in that the actuating lever is coupled at one end so as to be pivotable about a second positionally fixed axis of rotation and is operatively connected at its other end to the actuating device.

A seating unit or an arrangement of a plurality of seating units is distinguished in that there is the device according to the invention for triggering the gas spring and a deactivation/activation unit which is connected in terms of communication to the device according to the invention and by means of which the energy supply of the device can be deactivated or activated, and in that each seating unit is connected in terms of communication to a central deactivation/activation unit.

Increased safety requirements are satisfied by the fact that the energy supply of each device can be activated or deactivated via the deactivation/activation unit independently of the switching unit. It can thereby be prevented, for example, that the backrest of a seat can be adjusted by the user in situations in which this is not permitted, for example in the take off or landing phase of aircraft. The seat arrangement in aircraft is of considerable economical significance. Until now, an increased distance between the seat rows has been required in the region of emergency exits in order to provide sufficient space in an emergency if a passenger in this region impermissibly brings their seat into the extended backrest position. Although passengers are requested during take off and during the landing approach to move their backrest into the upright position, which is also checked by the steward/stewardesses, there is the risk that a passenger will still put the backrest back into the extended position after the checking operation, with the space requirement specifically in the emergency exit region then being restricted. This safety risk is eliminated by the seating unit according to the invention or seat arrangement in conjunction with the central deactivation/activation unit by the voltage supply of the individual devices being able to be deactivated centrally. In this respect, there is the possibility of reducing the seat distances in the region of the emergency exits since the risk of an impermissible adjustment of the backrest in the take off and landing phase no longer exists, as a result of which overall more seating units can be arranged in the interior cabin of an aircraft, which significantly increases the economical operation.

Further embodiments and advantages of the invention emerge from the features further listed in the claims and from the exemplary embodiments indicated below. The features of the claims can be combined with one another in any desired manner, unless they clearly mutually exclude one another.

BRIEF DESCRIPTION OF THE DRAWING

The invention and advantageous embodiments and developments of same are described and explained in more detail below with reference to the examples illustrated in the drawing. The features which can be gathered from the description and the drawing can be used, according to the invention, individually by themselves or in a plurality in any desired combination. In the drawing:

FIG. 1 shows a schematic longitudinal section through a device for triggering a gas spring, comprising an actuating member with a lever mechanism and an actuating device which has an electric magnet unit and a control device, in longitudinal section in the activated state, FIG. 2 shows a schematic cross section of the device according to FIG. 1, FIG. 3 shows a schematic longitudinal section through a device for triggering a gas spring, comprising an actuating member with a lever mechanism and an actuating device which has an electric magnet unit and a control device, in longitudinal section in non-activated state, FIG. 4 shows a schematic cross section of the device according to FIG. 3.

WAYS OF IMPLEMENTING THE INVENTION

Figure 5:
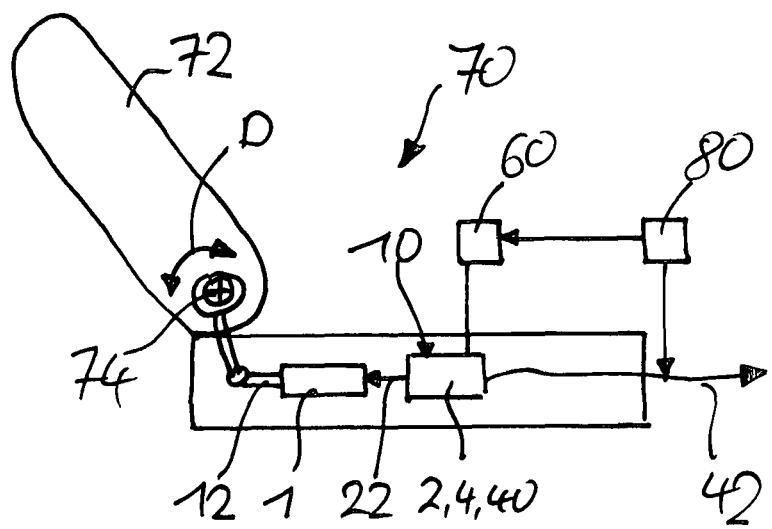
FIG. 5 shows a highly schematized sectional illustration of a seating unit with a backrest which is adjustable under the action of a gas spring, with a device for triggering the gas spring.

FIGS. 1 to 4 show a device for triggering a gas spring 1, wherein the gas spring 1 is illustrated only on the end side, and FIGS. 1 and 2 show the device 10 in the activated state and FIGS. 3 and 4 show the device 10 in the non-activated state.

The device 10 has an actuating device 2 and an actuating member 4 which is operatively connected to the actuating device 2 and acts directly on the end-side trigger 3 of the gas spring 1. The actuating member 4 is designed as a lever arrangement 5 which reduces or multiplies in terms of force and/or travel, wherein one of the levers, what is referred to as the triggering lever 6, pushes directly against the trigger 3. The triggering lever 6 is coupled at one end so as to be pivotable about a second positionally fixed axis of rotation 7 and is pivotably connected at its other end to a second lever, what is referred to as the connecting lever 8, at the end thereof. The connecting lever 8 is pivotably connected at its other end to a third lever, what is referred to as the actuating lever 9. The actuating lever 9 is coupled at its one end so as to be pivotable about a first positionally fixed axis of rotation 11 and is operatively connected at its other end to the actuating device 2. This mechanism 5 is known from EP 0 907 842 B1.

The ratio of the lever portions firstly of the triggering lever 6 between the positionally fixed second axis of rotation 7 and the trigger 8 and also between the trigger 3 and the pivoting connection to the connecting lever 8 and secondly of the actuating lever 9 between the positionally fixed first axis of rotation 11 and the pivoting connection to the connecting lever 8 and also between the pivoting connection to the connecting lever 8 and the free end or operative connection to the actuating device 2 predetermines the size of the reduction or multiplication.

The actuating member 4 is aligned with the gas spring 1. The actuating member 4 is subordinate in a housing 20.

The actuating device 2 has a cylindrical actuating device housing 36 which, on the upper side, has a connected connection cap unit 38 which is tapered in two stages and is connected to the housing 20.

Arranged inside the actuating device housing 36 is an electric magnet unit 30 which is designed as a lifting magnet, with a hollow coil body 32, in the interior cavity of which an armature body 34 is present in a manner displaceable longitudinally in the longitudinal direction L.

There is a tappet unit 48 on the upper side of the armature body 34, inside which tappet unit there is connected an actuating element 22 which is guided outward through the connection cap unit 38 and is connected inside the housing 20 to the actuating lever 9 of the lever mechanism 5. The actuating element 22 is designed as a cable.

The armature body 24 is under the action of a spring unit 24 which, in the exemplary embodiment, is designed as a compression spring. The spring unit 24 is supported firstly at the armature body 34 and secondly at the opposite end against the inwardly projecting wall of the connection cap unit 38.

The tappet unit 48 is mounted on the lower side on a shaft securing unit 44 which, in turn, is mounted on a rubber ring unit 46 for damping purposes.

Below the magnet unit 30, there is a control device 40 inside the actuating device housing 36, said control device acting upon the electric magnet unit 30 via a current cable 42, wherein said current cable 42 also leads to an externally present current supply.

The control device 40 is activated via a switching unit 60, which is illustrated schematically in FIG. 1.

FIG. 1 simultaneously schematically illustrates a master central deactivation/activation unit 80 by means of which the voltage supply of the device 10 may be deactivated/activated.

The control device 40 is activated via the switching unit 60 and for its part activates the electric magnet unit 30. The control device 40 in the exemplary embodiment illustrated is configured here in such a manner that it activates the magnet unit 30 for, for example, 5 ms at 20 V (override phase) and then the voltage drops to 6 V (holding phase). Reliable triggering of the gas spring 1 is thereby ensured.

FIGS. 3 and 4 illustrate the non-activated state. The armature body 34 is located in the upper extended position under the action of the spring unit 24. No pressure is exerted on the trigger 3 of the gas spring 1 via the lever mechanism 5 of the actuating member 4. The gas spring 1 is not activated in this state. The adjustable component which is not illustrated specifically in FIGS. 3 and 4 and to which the piston rod of the gas spring 1 is connected is therefore arrested in its position. If the actuating device 2 is then activated by actuation of the switching unit 60, the control device 40 acts upon the hollow coil body 32 of the magnet unit 30 with voltage, and therefore, because of the magnetic field thereby building up, the armature body 34 is moved downward in the longitudinal direction L with a supporting action of the spring unit and enters the interior cavity of the hollow coil body 32. This state is illustrated in FIGS. 1 and 2. The actuating lever 9 is thereby rotated counterclockwise about the first positionally fixed axis of rotation 11, and therefore the triggering lever 6, because of the coupling to the connecting lever 8, carries out a rotation in the clockwise direction about the second axis of rotation 7 and actuates the trigger of the gas spring 1, as a result of which the component connected to the piston rod of the gas spring can be moved. As soon as the magnet unit 30 is deactivated, the actuating lever 9 is rotated in the clockwise direction about the first axis of rotation 11 via the lever mechanism 5 by means of the restoring force of the gas spring 1 and the armature body 34 moves counter to the action of the spring unit 24 into the extended position illustrated in FIGS. 3 and 4. In this state, no pressure is exerted on the trigger 3 via the lever mechanism 5 of the actuating member 4, and the gas spring 1 is thereby blocked with respect to the movement of its piston rod, as a result of which the component which is connected to the piston rod is fixed in its position.

Since the override phase requires a relatively high amount of current, which may under some circumstances have a negative effect on the current supply network when a plurality of consumers are present, measures are provided according to the invention for reducing the current for the entire network during activation of the magnet units, said measures being designed in concrete terms as a buffer storage unit, which is not illustrated specifically in the figures. The buffer storage unit can be, for example, a capacitor or accumulator.

According to the invention, upon activation first of all via the control device 40, the energy of the buffer storage unit (of the capacitor) is transmitted to the electric magnet unit 30, as a result of which the overall current network is initially not loaded. In the holding phase, the energy available through the current network is sufficient. At the same time, the control device 40 ensures that the buffer storage unit is charged up again and is available again during the next activation process.

In addition, a second buffer storage unit, for example a capacitor or accumulator, can be present, said buffer storage unit being connected directly to the voltage supply and having a high capacity and from which the electrical energy can be withdrawn in the override phase. Said second buffer storage unit can be connected, for example, to a plurality of devices and reliably reduces the risk of overloading the current network.

FIG. 5 illustrates in a greatly schematized manner a seating unit 70 which has a backrest 72 which is pivotable in the direction of rotation D about an axis of rotation 74. The rotational movement of the backrest 72 is coupled to the piston rod 12 of the gas spring 1, that is to say rotation of the backrest 72 is possible only if the gas spring 1 permits this rotation D by extension and retraction of its piston rod 12 or is activated via the device 10 by actuation of the switching unit 60. Backrests of this type are referred to, for example in aircraft construction, by the technical term "backrest recline".

Figure 6:
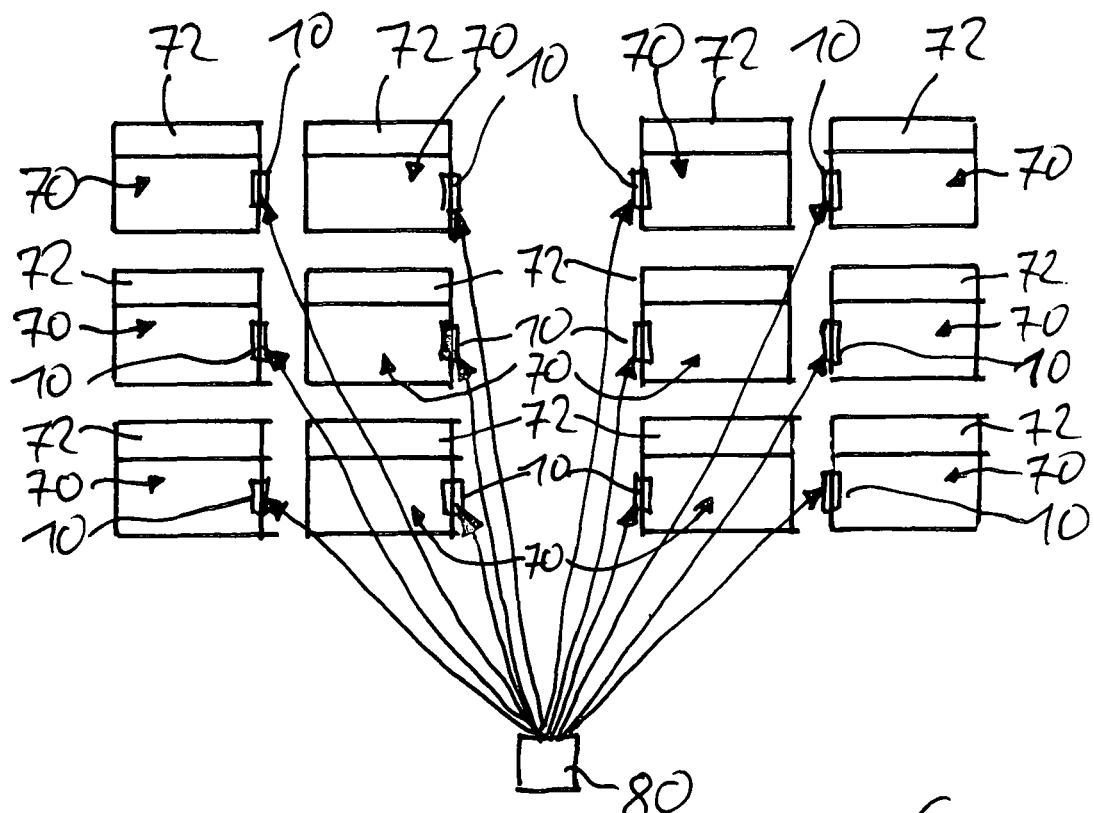
FIG. 6 shows a schematic top view of the detail of a seat arrangement with a plurality of seating units according to FIG. 5 and a central deactivation/activation unit.

FIG. 6 schematically illustrates, in a top view, an arrangement of a plurality of seating units 70 as can be present, for example, in the interior cabin of an aircraft. Each device 10 is connected in terms of communication to the master deactivation/activation unit 80—either via a wired connection or a wireless connection, wherein the voltage supply of the actuating device 2 of the device 10 can be switched off and switched on again in a targeted manner by actuation of the deactivation/activation unit 80.

The master deactivation/activation unit 80, by means of which the current supply can be interrupted in a targeted manner such that the switching unit 60 is ineffective increases the safety overall since, in the phases in which actuation of the gas spring is not desired, said actuation is reliably prevented.

The master deactivation/activation unit 80 can also be connected to the device 10 or the devices 10 in such a manner that the device 10 or the devices 10 is or are activated via the deactivation/activation unit 80 itself, and therefore, for example, all of the backrests of seating units of seat arrangements can be promptly reset. This is advantageous, for example, in seat arrangements in trains, buses, ships (ferries) since, as a result, the staff does not have to bring each individual backrest of the seating unit into the starting position before the start of a trip. In the region of seating units of passenger vehicles, the device according to the invention provides a reasonably priced, permanently reliably functioning seat unit adjustment which is free of an electric motor, which increases the comfort and at the same time permits economic production.

The device 10 according to the invention for triggering a gas spring can be used because of its compact geometry with regard to operating location and the actuating device 2 in a very wide variety of geometrical space conditions of the surrounding components, requires little space, can be produced economically, can be adapted variably to the respective requirements and also ensures permanently reliable functioning. Furthermore, high safety standards can be ensured.

The invention claimed is:

1. A device for triggering a gas spring, comprising:
   an actuating device including an electric magnet unit;
   an actuating member which is operatively connected to the actuating device and acts directly on an end side trigger of the gas spring, the actuating member being a lever mechanism comprising a triggering lever which pushes directly onto the trigger;
   a control device which is electrically connected to a switching unit and which activates the electric magnet unit in response to signals received from the switching unit; and
   an actuating device housing which completely encloses the control device and the electric magnet unit,
   wherein the control device activates the electric magnet unit
      by applying, during an override phase, an increased voltage to the electric magnet unit, and
      by applying, during a subsequent holding phase, a reduced voltage to the electric magnet unit, the reduced voltage being greater than zero and lower than the increased voltage, and
   wherein at least one of
      a duration of the override phase,
      a magnitude of the increased voltage, and
      a magnitude of the reduced voltage
      is selectable in the control device.

2. The device as in claim 1,
   further comprising an electric buffer storage unit,
   wherein the control device, upon activation during the override phase, retrieves electrical energy from the electric buffer storage unit and supplies the retrieved electrical energy to the electric magnet unit.

3. The device as in claim 2, wherein the electric buffer storage unit is a capacitor or an accumulator which, after being discharged, is recharged via the control device or an external voltage supply.

4. The device as in claim 1, wherein the electric magnet unit comprises
a hollow coil body and
an armature body which is mounted in a longitudinally displaceable manner in the hollow coil body,
wherein the armature body is coupled to the lever mechanism of the actuating member via an actuating element.

5. The device as in claim 4, further comprising an elastic unit which generates a force that acts on the armature body in a longitudinally displaceable manner.

6. The device as in claim 5, wherein the elastic unit is a spring unit.

7. The device as in claim 5, wherein the actuating element is a cable, and the elastic unit is a compression or tension spring.

8. The device as in claim 6, further comprising an actuating device housing which completely encloses the control device and the electric magnet unit and at least partially encloses the spring unit and the actuating element.

9. The device as in claim 8,
wherein the actuating device housing is arranged directly on or spaced apart from a housing of the actuating member and
wherein the actuating element projects into the housing of the actuating member and is connected to an actuating lever of the lever mechanism.

10. The device as in claim 9,
wherein the actuating device housing has a hollow profile with an upper side connection cap unit for connection to the housing of the actuating member.

11. The device as claimed in claim 10, wherein the hollow profile is a cylindrical hollow profile.

12. The device as in claim 1,
wherein the triggering lever is coupled at one end so as to be pivotable about a first positionally fixed axis of rotation and pivotably connected at its other end to a first end of a connecting lever,
the connecting lever being connected pivotably at a second end to an actuating lever,
the actuating lever being coupled at a first end so as to be pivotable about a second positionally fixed axis of rotation and operatively connected at a second end to the actuating device.

13. A seating unit, comprising:
the device for triggering a gas spring as in claim 1; and
a backrest which is rotatable about an axis of rotation, wherein the gas spring is configured to arrest rotational movement of the backrest in its respective rotational position.

14. The seating unit as claimed in claim 13, further comprising a central deactivation/activation unit
which is connected to and in communication with the device for triggering a gas spring and
which is configured to at least one of
deactivated or activated a supply of energy to the device for triggering a gas spring and
activate the switching unit.

15. An arrangement comprising a plurality of seating units as in claim 14,
wherein each seating unit is connected to and in communication with the central deactivation/activation unit.

16. The arrangement as in claim 15, arranged inside an interior cabin of an aircraft.

17. A system, comprising:
the device for triggering a gas spring as in claim 1; and
an external electric buffer storage unit arranged separately from the device for triggering a gas spring,
wherein the control device, upon activation during the override phase, retrieves electrical energy from the external electric buffer storage unit and supplies the retrieved electrical energy to the electric magnet unit.

* * * * *